W. CHABAYLO.
BREAD CUTTER.
APPLICATION FILED JULY 11, 1919.
1,330,302. Patented Feb. 10, 1920.
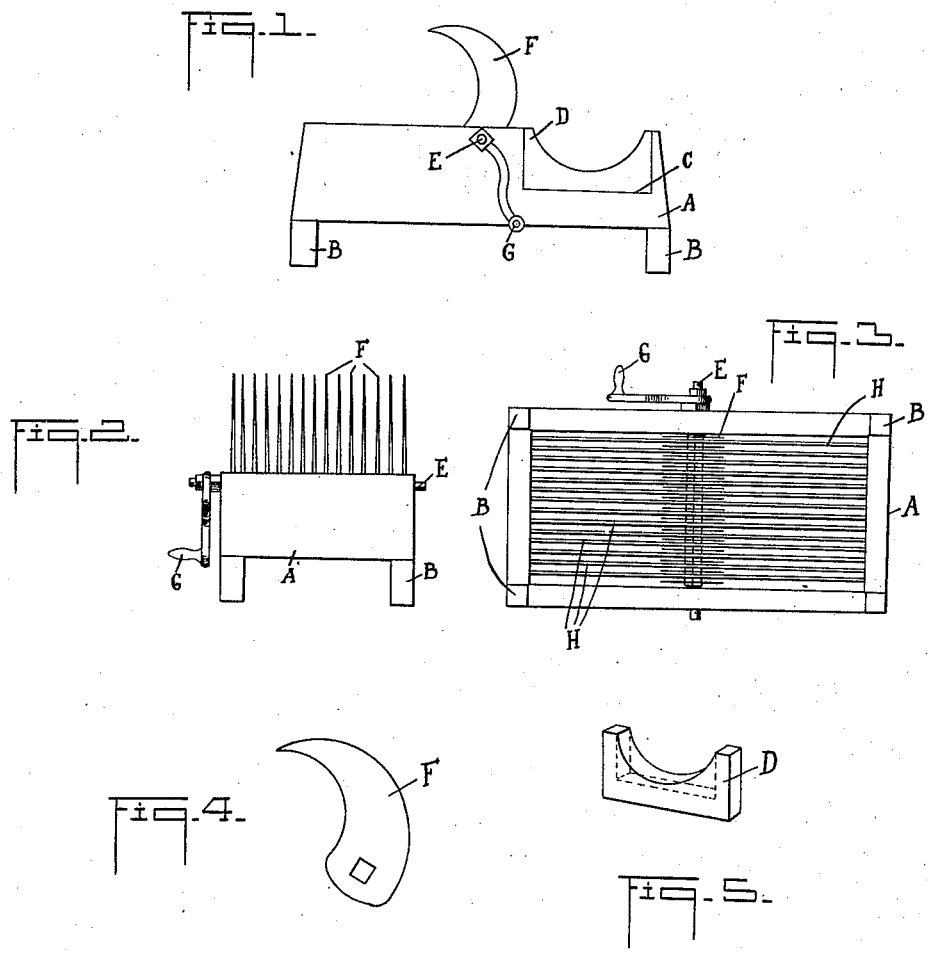
INVENTOR
Wasyl Chabaylo
BY
ATTORNEY

UNITED STATES PATENT OFFICE.

WASYL CHABAYLO, OF INSINGER, SASKATCHEWAN, CANADA.

BREAD-CUTTER.

1,330,302. Specification of Letters Patent. Patented Feb. 10, 1920.

Application filed July 11, 1919. Serial No. 310,069.

*To all whom it may concern:*

Be it known that I, WASYL CHABAYLO, a citizen of the Dominion of Canada, residing at Insinger, in the county of Mackenzie and Province of Saskatchewan, Canada, have invented certain new and useful Improvements in Bread-Cutters, of which the following is a specification.

This invention relates to bread cutters used more extensively in hotels and other similar places where a great quantity of bread is used daily.

Another object is to provide a cutting means simple in operation, inexpensive to manufacture and one which will not easily get out of order.

With these and other objects in view, the invention consists in the construction, combination and arrangement of parts as will be hereinafter fully described, illustrated in the accompanying drawings, and pointed out in the claim hereunto appended.

In the drawings:

Figure 1 shows a side elevation of my invention,

Fig. 2 shows an end view of the same,

Fig. 3 shows a bottom plan view of my invention,

Fig. 4 shows one of the cutting members, and

Fig. 5 shows the cutting block, dotted lines showing a different style of block for holding the bread.

Referring to the drawings like numerals designate like parts in the various drawings.

A indicates a body member mounted on suitable legs B having slots C cut on the upper side of the side members of the body A. These slots C are provided with a suitable guide block D slidably mounted therein. This guide block may have a semi-circular upper face so as to receive round bread, or it may be angular or any other desired shape so adapted to receive the different standard shapes of bread. With each machine there will be a number of different blocks D having various shaped upper faces so that the operator may use any of these when cutting any of the different standard shapes of bread. These blocks D will go in pairs, one for use on each side of the body member A.

An axle E is mounted to rotate in the side members, member A and this axle carry a number of cutting blades F, which cutting blades diminish in width toward their free end. A suitable turning handle G may be mounted on the axle E so as to operate the same. The bottom portion of the body member A is provided with longitudinally extending rods H, between which the cutting blades F rotate in turning and through which any crumbs may fall.

In operating this bread cutter, a loaf of bread is positioned with its ends in the respective blocks D, the handle G is then operated so as to turn the cutting blades F through the bread and the bread is then lifted out cut in slices.

From the foregoing it is thought that the construction of my invention will be clearly understood, and therefore a more extended explanation has been omitted.

What I claim as new, is,—

A bread cutter consisting of a rectangular body member, an axle mounted in the side members of said body member, cutting blades carried by said axle, a handle mounted on one end of said axle adapted to rotate said axle, slots formed in the sides of said body member, said slots being in front of said cutting blades, blocks slidably mounted in said slots and said blocks having any desired shaped faces adapted to hold any standard shape of bread.

In testimony whereof I affix my signature in the presence of two witnesses.

WASYL CHABAYLO.

Witnesses:
FANNIE SORENSEN,
SEMION CHABAYLO.